United States Patent [19]

Dehner, Jr. et al.

[11] Patent Number: 4,954,981
[45] Date of Patent: Sep. 4, 1990

[54] METHOD AND APPARATUS FOR ACCESSING AND MANIPULATING TIME SERIES

[75] Inventors: Charles V. Dehner, Jr., Lenexa, Kans.; Theodore E. Kihm, Kansas City, Mo.

[73] Assignee: CoWorks, Kansas City, Mo.

[21] Appl. No.: 245,908

[22] Filed: Sep. 16, 1988

[51] Int. Cl.$^5$ .................................... G06F 15/401
[52] U.S. Cl. .................................. 364/900; 364/974; 364/948.21
[58] Field of Search ... 364/200 MS File, 900 MS File, 364/569, 570, 582, 300

[56] References Cited

U.S. PATENT DOCUMENTS

| | | | |
|---|---|---|---|
| 4,276,597 | 6/1981 | Dissly et al. | 364/200 |
| 4,476,528 | 10/1984 | Matsumoto et al. | 364/200 |
| 4,631,664 | 12/1986 | Bachman | 364/200 |

Primary Examiner—Thomas M. Heckler
Attorney, Agent, or Firm—Wolf, Greenfield & Sacks

[57] ABSTRACT

This invention relates to a system for accessing, manipulating and displaying time series from a stored collection of time series. In particular, the system permits the user to reconfigure the collection of time series by storing and separately indexing either individual time series which are generated as a result of user instigated manipulation or blocks of time series generated and/or selected by the user and for separately indexing the time series so stored so as to facilitate their accessing by the user. An index is also provided for the collection of time series which is preferably arranged in a hierarchical multilevel menu form by subject matter. This permits the user to quickly and easily locate either single time series or blocks of time series of interest. The math functions which may be performed on time series include certain moving transformations not heretofore available including moving variance, moving standard deviation and moving correlation and covariance on two or more time series. The performance of standard conversions is also facilitated by storing conversion data in the shell operating system so that such conversions can be performed in response to a simple command. The time series, both time series from the original collection and user generated time series, are graphically displayed and certain features are provided for enhancing the usefulness of such displays.

76 Claims, 9 Drawing Sheets

F IG. I

| LEVEL # | | |
|---|---|---|
| 1 | MENU TITLES | SUBLEVEL ADDRESSES FOR EACH TITLE |
| 2A | MENU TITLES | SUBLEVEL ADDRESSES |
| ⋮ | ⋮ | ⋮ |
| 2N | MENU TITLES | SUBLEVEL ADDRESSES |
| 3Aa | MENU TITLES | BLOCK ADDRESSES |
| ⋮ | ⋮ | ⋮ |
| 3An | MENU TITLES | BLOCK ADDRESSES |
| ⋮ | ⋮ | ⋮ |
| 3Na | MENU TITLES | BLOCK ADDRESSES |
| ⋮ | ⋮ | ⋮ |
| 3Nn | MENU TITLES | BLOCK ADDRESSES |

NOTES  SINGLE  BLOCK  MEMORY  BACK-UP ONE LEVEL

TITLE FOR SERIES #1
|
|
|
TITLE FOR SERIES #N

GNP AND PRIME INTEREST RATE
ANNUAL 1978-1984, QUARTERLY 1985-1987

□ GNP    + PRIME SCALED TO GNP.

METHOD AND APPARATUS FOR ACCESSING AND MANIPULATING TIME SERIES

FIELD OF THE INVENTION

This invention relates to methods and apparatus for accessing, manipulating and displaying a large collection of time series.

BACKGROUND OF THE INVENTION

A time series is a repeated measurement, estimate, or other indication of a magnitude or other value taken generally at predetermined time intervals over an extended time frame. Examples of time series are annual population figures for a selected geographic area, the gross national product for a particular country on an annual, quarterly or monthly basis and the like.

Time series currently represent one of the largest data bases of historical and current information on economic, social, resources, environmental and political conditions, and other subjects. However, to effectively use such time series, and more particularly to turn such time series into information useful in making decisions, forming opinions, and making projections, effective techniques must be provided not only for permitting the user to quickly and easily retrieve all of the available time series relevant to his particular problem, but also for permitting the user to perform a variety of transformations and other manipulations on such time series to develop additional useful information. It is also desirable that all available time series information, both the originally stored time series and time series generated as a result of manipulations on the raw data, be present in a form which permits the user to easily perceive relationships, trends and the like in the data. While the graphic capability which now exists in most computers permits the user to more easily perceive relationships, new tools are required to permit the effective utilization of such capabilities. Further, since the user frequently does not know what he is looking for until he finds it, the system should be organized to assist the user in locating useful data. In addition, since old patterns of thought and expectations ma limit the user's ability to find what he needs or perceive useful relationships, the system should assist the user in being creative in the use of the available data to achieve his desired objectives. Thus, the system should provide guidelines for the use of the time series data, but permit the user to make all decisions in using the data. The amount of information which the user receives at each point on which to base decisions should also be limited so as to avoid user confusion from choice overload, thus making it easier for the user to make decisions. In addition, the system should preferably be free standing with all catalog entries in the system rather than in a separate written catalog. This, among other things, makes it easier for the catalog to be updated to reflect entries made by the user. It is also easier for the user to make catalog selections from an entry title shown in the context of its topics rather than merely from a code for the time series from, for example, a written catalog as is the case for some prior art systems.

Further, the user should be permitted to reconfigure the data to his requirements rather than being limited by the rigid file structure of prior art systems where new data bases for the system must be purchased to get data in a different form. Thus, once the user has collected all of the time series relevant to his problem, both originally stored time series and time series generated as a result of manipulations by the user on the original data, such information should be stored and cataloged in a manner such that it may all be retrieved quickly either as a single block or as desired time series rather than requiring the user to separately locate and to again retrieve each of the individual original time series and to either regenerate series resulting from manipulations on this data or to locate and retrieve each such generated series from the location where it was stored. Further, in order to convert the time series into useful information, it is desirable that the technique utilized be adapted to quickly and easily convert the raw data to, for example, a per capita basis or to adjust annual financial figures for inflation (i.e., express in constant dollars). Finally, additional useful information can frequently be obtained from time series by performing certain moving transformations thereon which moving transformations have not heretofore been available. Such moving transformations include, but are not limited to, moving variance or moving standard deviation on a single time series, and moving covariance or moving correlation between two or more time series.

While systems currently exist which are adapted to access, display and perform certain manipulations on time series, none exist which are capable of effectively performing the various functions indicated above.

It is therefore an object of this invention to provide an improved method and apparatus for facilitating the retrieval of all time series in a collection of time series which are relevant to the solution of a particular problem.

Another object of this invention is to permit the retrieved time series to be transformed or otherwise manipulated, and in particular to permit certain moving transformations to be performed on such data and to facilitate the transformation of such data to a adjusted for-inflation, per capita, or other converted form.

Still another object of this invention is to permit the time series resulting from a transformation or manipulation of the original data to be separately stored and to facilitate the easy retrieval of all time series, both originally selected time series and time series generated as a result of manipulations, which time series are relevant to the solution of a particular problem.

SUMMARY OF THE INVENTION

In accordance with the above, this invention provides a method and apparatus (i.e., system) for facilitating the accessing, display and manipulation of time series data by a user. A first bulk storing means is provided for storing a plurality of blocks of time series each of which blocks contains a number of time series. The time series are cataloged, the catalog being arranged in a hierarchical form by subject matter. In response to a user access request, a first subject matter menu is provided. In response to a user selection from the first, and each successive subject matter menu, the user is provided with a successive level of subject matter menu. In response to a user s selection from a predetermined menu level, the user is provided with the individual time series names for a block stored in the first storing means. A second storage means is also provided for storing a plurality of time series. A predetermined area of the second storing means, which is adapted to store a number of time series such as for example a block, is designated as a user area. In response to the user selecting a time series or block of time series from the menus provided, the selected time series o block of time series is transferred from the first storing means to the second storing means. Predetermined functions are performed on one or more of the time series in response to user requests. The results of each such function performed are stored in the user area and the time series stored in the user area are cataloged. One or more time series stored in the second storing means, including time series stored in the user area, may be graphically displayed in response to user inputs. The system may display portions of a given graph in two or more different time periodicities and, where two or more graphs are displayed, scaling may be provided. Time series stored in the user area may also be selectively transferred to the first storing means.

Preferably, the number of time series which may be stored in a block is fixed and the number of time series which may be stored in the user area is equal to this fixed number so that a user block may be stored in the user area. The fixed number of time series for a block should be small enough so as not to overload and confuse the user in making choices. Since the user area may also store selected original time series, a particular user block may be configured to contain all time series needed by the user for a particular problem.

The system may also include a means operative at selected times for providing the user with material not directly related to the time series being accessed or the manipulation thereof which material is adapted to stimulate the user s creativity in the use of the system. Such material may for example be literary snippets.

At least one of the functions which is performed is a moving transformation on one or more time series. The moving transformation performed may be moving variance or moving standard deviation for a given time series, or moving covariance or moving correlation for two or more time series. Finally, for the performance of certain conversion functions on a time series, a means is provided for storing in the shell or operating system conversion data for a plurality of time points and for utilizing the stored conversion data to transform the the time series for each point thereof.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
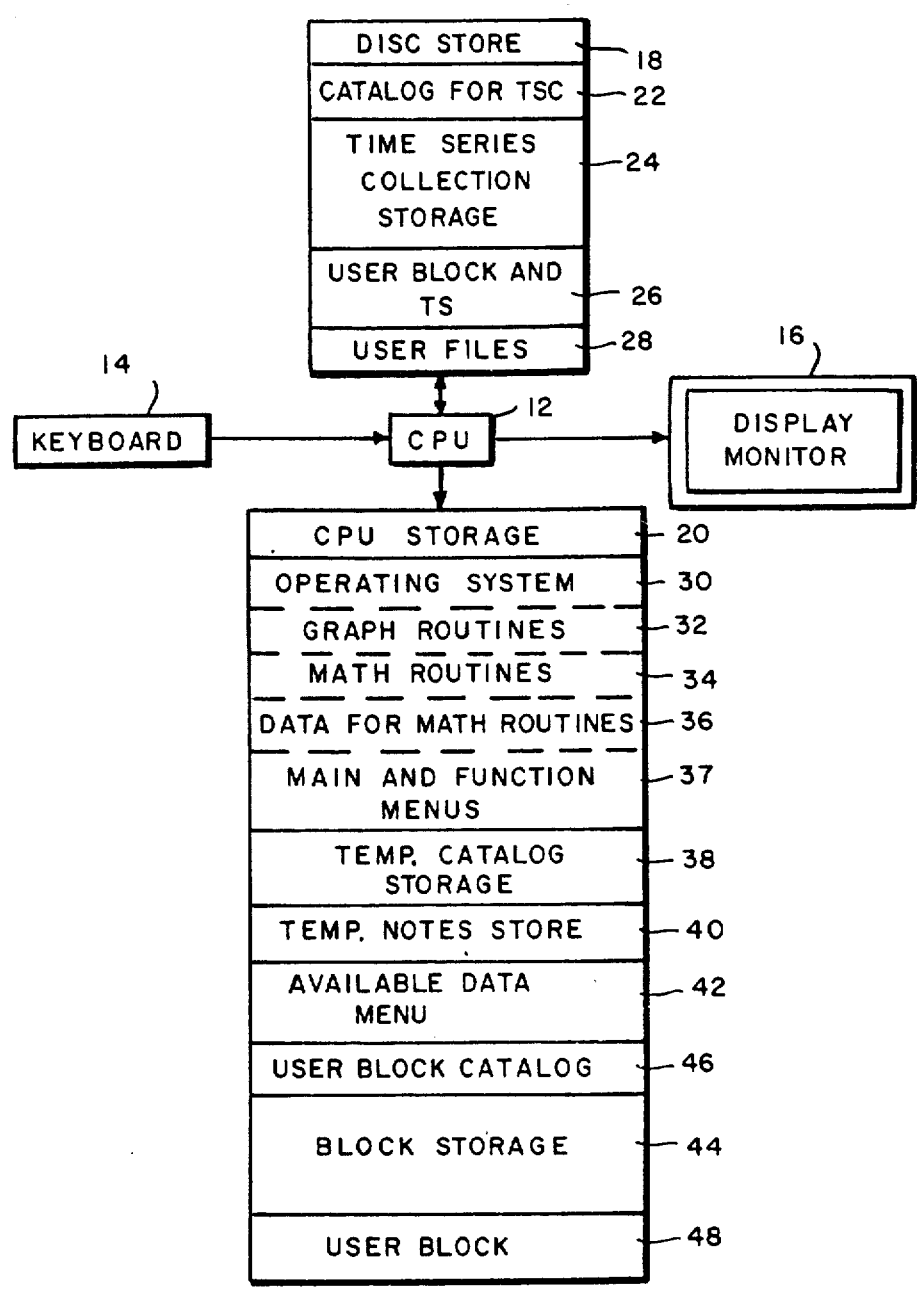
FIG. 1 is a schematic block diagram of a computer system which may be utilized in practicing the teachings of this invention.

FIG. 1 illustrates a system which might be utilized in practicing the teachings of this invention. Referring to FIG. 1 the heart of the system is a central processing unit (CPU) 12 which may for example be any of a variety of personal computers such as the IBM PC, the Apple Macintosh, or various computers program compatible therewith. Inputs to CPU 12 are obtained from a standard input keyboard 14 which keyboard, in addition to various alphanumeric keys, also has keys for controlling the movement of a cursor across the screen of a standard display monitor 16. Keyboard 14 and display monitor 16 may be any standard components for performing these functions. In addition to, or instead of, keyboard 14, input controls, and in particular controls for the cursor on display monitor 16, may be obtained by use of a "mouse", a joystick, or other control currently used for controlling the position of a cursor on a display monitor. Menu selection may also be made in other ways such as in response to voice inputs, etc.

The system also includes two storage devices. The first storage device 18 may for example be an off line bulk storage device such as a magnetic disk, optical disk, or other commercially available bulk storage devices. The other storage device 20 is an on line storage device which serves as a memory device for CPU 12 and may be any one of a variety of commercially available random access memories (RAM's) currently utilized to perform such function. The capacity of RAM 20 may for example be 119 time series while the capacity of bulk store 18, being modular and replaceable, may be virtually unlimited.

Figures 2, 3:
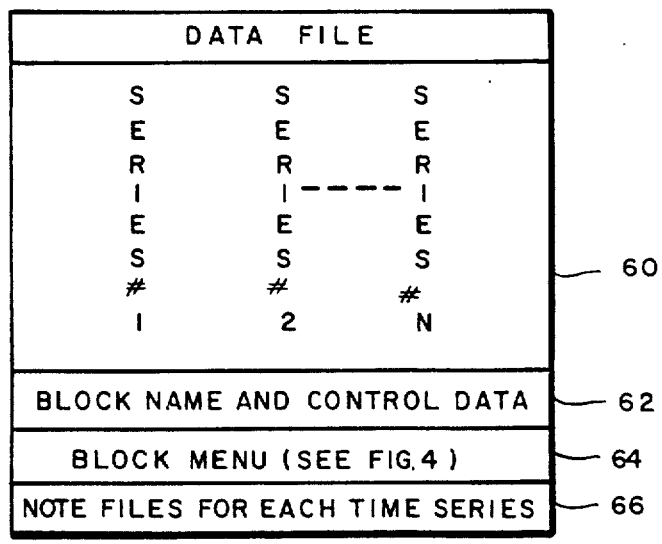
FIG. 2 is a diagram illustrating the contents of the collection of time series catalog shown in FIG. 1.
FIG. 3 is a diagram illustrating the structure for a single block of the time series collection.

Store 18 has four areas. A first area 22 stores a catalog for the collection of time series available in store 18. As will be discussed in greater detail in conjunction with FIG. 2, the catalog is organized in a hierarchical form by subject matter. The second area 24 of store 18 contains a collection of time series which are organized in blocks, the time series in each block being related by subject matter. FIG. 3 shows the structure for a single block stored in time series collection 24, this structure being described in greater detail later. Area 26 of store 18 contains one or more blocks of time series and/or individual time series which have been generated by the system user and area 28 contains a file or catalog of the user blocks and a file or catalog of individual user time series stored in area 26. The manner in which the user blocks and time series are generated, stored and cataloged are discussed in greater detail later.

Storage 20 also has a plurality of areas. In particular, storage 20 contains the operating system or shell 30 for CPU 12. Included as part of the shell are certain standard graph routines 32 which are performed by CPU 12 to cause a graphic display of a given one or more time series to appear on display monitor 16. The operating system also includes a plurality of math routines 34 some of which math routines will be discussed in greater detail later. In addition, the shell contains certain data in an area 36 for use in performing certain of the math routines such as data required to adjust to constant dollars or other currency to compensate for inflation, to obtain per capita figures or other types of unit conversions. This data may be provided with the system and/or the user may cause certain data to be stored in area 36 so as to permit transformations/conversions required by the user to be more quickly and easily performed. The manner in which the data stored in area 36 is utilized will be discussed in greater detail later. Finally, the operating system contains certain menus in area 37 which are utilized by the user in a manner to be discussed later to control system operation.

In addition to storing the routines, data and menus indicated in areas 32, 34, 36 and 37, the operating system also contains routines and data required to perform other standard functions to be performed by CPU 12.

In addition to storing the operating system 30, storage 20 also contains an area 38 which is a temporary catalog storage for permitting certain portions of the catalog stored in area 22 of store 18 to be temporarily stored and displayed on monitor 16. Similarly, a temporary notes store area 40 is provided for storing descriptive notes for selected time series from collection 24 so that such notes can be displayed on monitor 16. An "available data menu" area 42 is provided for storing a menu of blocks and time series stored in block storage area 44 and a user block catalog area 46 is provided for storing a catalog of time series stored in user block area 48. As will be discussed in greater detail hereinafter, block storage area 44 stores blocks of time series transferred from area 24 of Store 18 aDd user block area 48 stores time series which may either be single time series selected from collection 24 by the user, single time series selected by the user from block storage 44 to be transferred to user block 48 or time series generated as a result of math functions performed on a time series from block storage 44 or user block 48. User block 48 preferably has a capacity to store a number of time series equal to the number of time series stored in a single block of the time series collection facilitating the universal feel to the catalog systems.

FIG. 2 is a diagram illustrating the contents of the "Catalog for Time Series Collections" storage area 22. For purposes of illustration, the menu is shown as having three levels of subject matter in the catalog, a selection at the third level being an address for one of the time series collections blocks stored in area 24 of store 18. However, it should be understood that, depending on the subject matter, the number of levels of subject matter menus in the catalog will vary and, within a given catalog, the number may vary for different branches depending on the subject matter of such branches.

Thus, for example, the level one menu titles might for example be geographic, such as for example "world", "association", "regional", "national" or the like. If "world" is selected, the next level might be a menu of subjects or subject areas available on a worldwide basis. Such general subject areas might for example be "Social", "Finance", "Economic", Resources", etc. However, if "national" is selected, the next level menu might be a listing of continents or other geographic subdivisions. When the user at this level selects one of the geographic areas, the next level menu presented would be a listing of countries within the geographic area. If at that level the user selects a country, then a listing of topics or topic areas for the selected country might be presented. Once a topic area menu is displayed, the user selection from such menu might result in the display of particular topics in the topic area. Once the user gets down to a particular topic for a selected country, the next level display might be the block menu for a particular block stored in time series collection storage area 24. To assist the user in locating a desired or required time series, the catalog structure may be such as to permit a particular block to be reached through different catalog paths.

As is shown in FIG. 3, each block of the time series collection contains a plurality of data files or time series in an area 60. One object of limiting the number of time series which a user has presented to him for decision at a given time is that, by limiting the user's choices at each stage in the decision process and thus preventing the user from becoming overloaded with information on which to make a choice, the user's decision process is facilitated. Experience has shown that users have difficulty making decisions when presented with too large a choice. Thus, each block might contain up to seventeen time series. The maximum number of choices on any menu also might also be limited preferable to a number in the five to eight range.

For each series in the data files, annual figures may be provided over an extended time period which may vary with the period over which such data exists or is available. In addition to providing annual information over an extended period, the series may also include quarterly, monthly and or weekly data where available for such data (or even daily or hourly where appropriate), generally over a shorter time period than the annual data is provided. The data for a preferred embodiment is presented with the annual data first, followed by quarterly data and then monthly data; but this order is by no means a limitation on the invention.

Figures 4, 10:
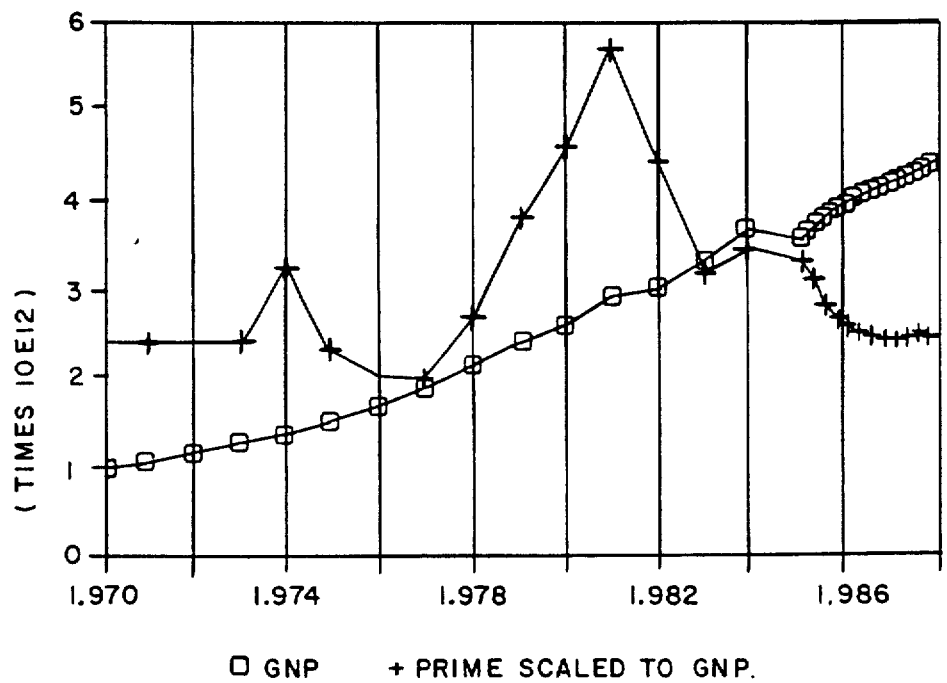
FIG. 4 is a diagram illustrating the contents of the block menu shown in FIG. 3.
FIG. 10 is a diagram illustrating a graphic display in accordance with a preferred embodiment of the invention.

Following the data files in a block structure is a memory area 62 containing the block name and certain control data useful in transferring the block. The next area in the block structure, area 64, contains the block menu which appears on the screen when the user selects a topic area corresponding to the block. The contents of the block menu is shown in FIG. 4 and will be described shortly. The final area 66 in the structure of each block contains note files for at least selected ones of the time series and preferably for the block and for all of the time series. The note files contain selected data concerning the block such as a general summary of the topic area and of the time series and, as will be described shortly, may be accessed and reviewed by the user to determine if the block or selected time series thereof are relevant to his requirements.

FIG. 4 shows the block menu which appears on display 16 when the topic corresponding to the particular block has been selected during a catalog search. Referring to FIG. 4, at the top of the menu are five options from which the user may make a selection. These options are "read notes", "select block", "select single series", "memory status", and "back-up one level in index". If the user selects "read notes", the cursor will move to the list of time series titles which appear under the five original options. The user then moves the cursor to select the time series for which he wishes to review the notes from the note files stored for such time series in the block structure (see FIG. 3). When the user makes this selection, the appropriate note files are read from the time series library storage 24 into temporary note store 40 from which they are utilized to cause the display of the notes on display monitor 16. The manner in which the notes stored in temporary notes storage area 40 are utilized to cause the notes to appear on monitor 16 is standard and will not be described.

Similarly, if the user selects the "single series" option, the cursor moves to the series title area prompting the user to select the time series which is to be transferred from the time series collections 24 to store 20. As will be discussed in greater detail later, when a single time series is transferred to storage 20, it is transferred to the user block area 48.

If the user enters the "select block" option, the entire block is transferred from time series collection 24 to block storage area 44 of storage 20. Typically all of the data files of the block structure shown in FIG. 3 would be transferred with the block to block storage area 44. The note files may or may not be transferred with the block and, if transferred, may be transferred either automatically or in response to a user request depending on the particular system configuration.

Since block storage 44 has a finite capacity, for example six or seven blocks, the user, if he has already transferred a number of blocks to block storage, may be concerned as to whether there is sufficient memory still available in this storage for storing the particular block. Under these circumstances, he can select "memory status" which will cause an indication of available storage space to be indicated on display 16. If for example sufficient capacity is not available in memory at the given time, the user may elect either to transfer only a single time series or two or more time series from the block to user block 48 or the user may elect to erase one of the blocks currently stored in block storage 44 so as to make room for the storage of the block he is currently looking at.

Since it is possible that the user may decide after viewing the time series titles for the particular block that the block is not appropriate for his requirements, it is desirable that the user be able to return to the previous level in the catalog to see if a different topic might be more appropriate rather than having to start the process from the beginning. The "back up one level in index" option in the block menu provides the user with this capability. To facilitate this operation, temporary catalog storage area 38 is large enough to contain two menus, the one currently being looked at and the preceding one, with the preceding menu being overwritten when a new menu comes in. Thus, the preceding menu stored in temporary catalog storage area 38 may be utilized to cause a display of the prior menu when the "back-up one level" option is selected. While this option is shown only at the block level, it may be made available as an option at any or all of the catalog levels. Further, if the temporary catalog storage area 38 is made large enough, all prior menus used in a search may be retained permitting the user to go back more than one level.

Figure 6A:
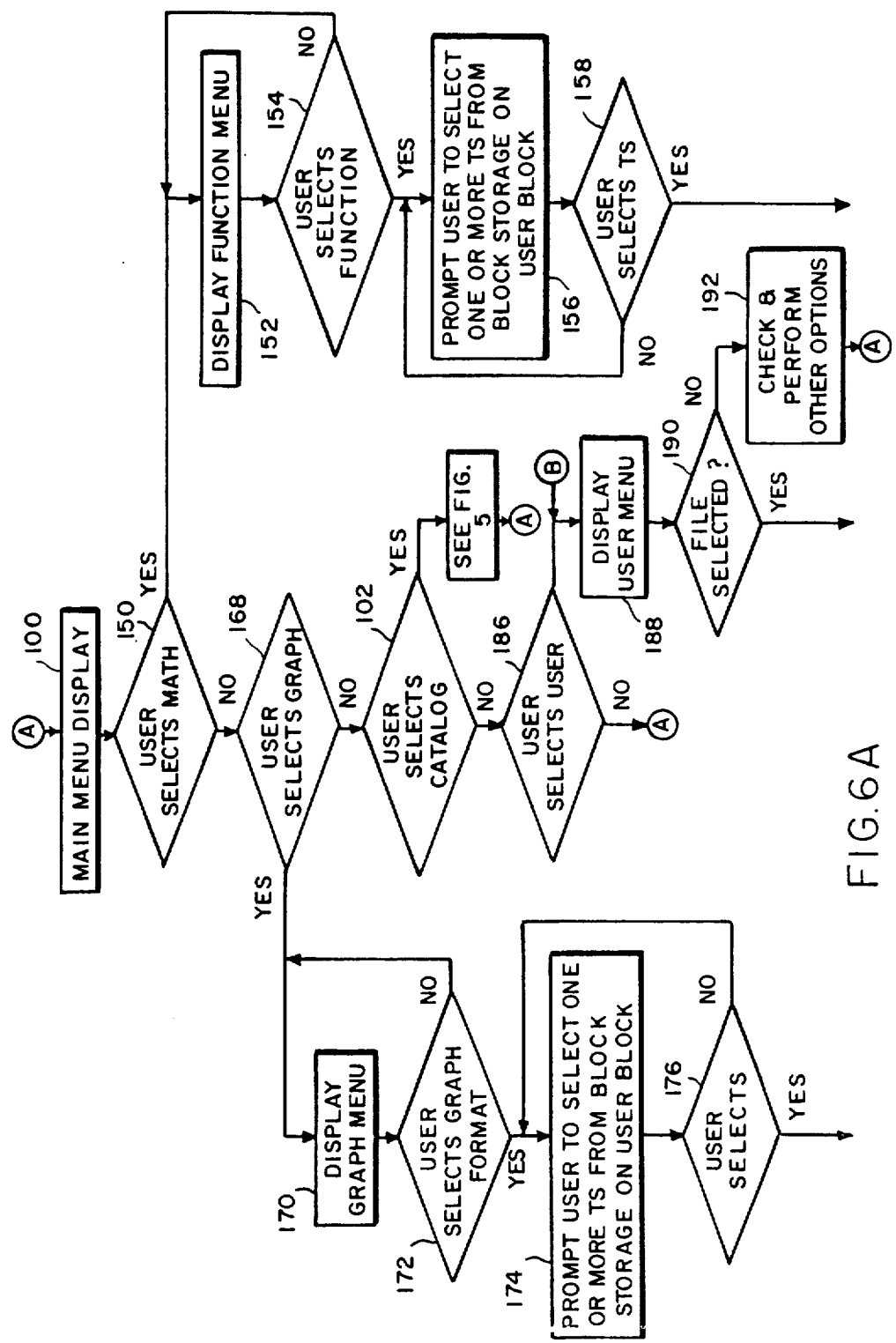
FIGS. 6A and 6B is a flow diagram for the functions performed from the main menu in accordance with a preferred embodiment of the invention and in particular for the "Math", "Graph", and "User" functions.
Figure 6B:
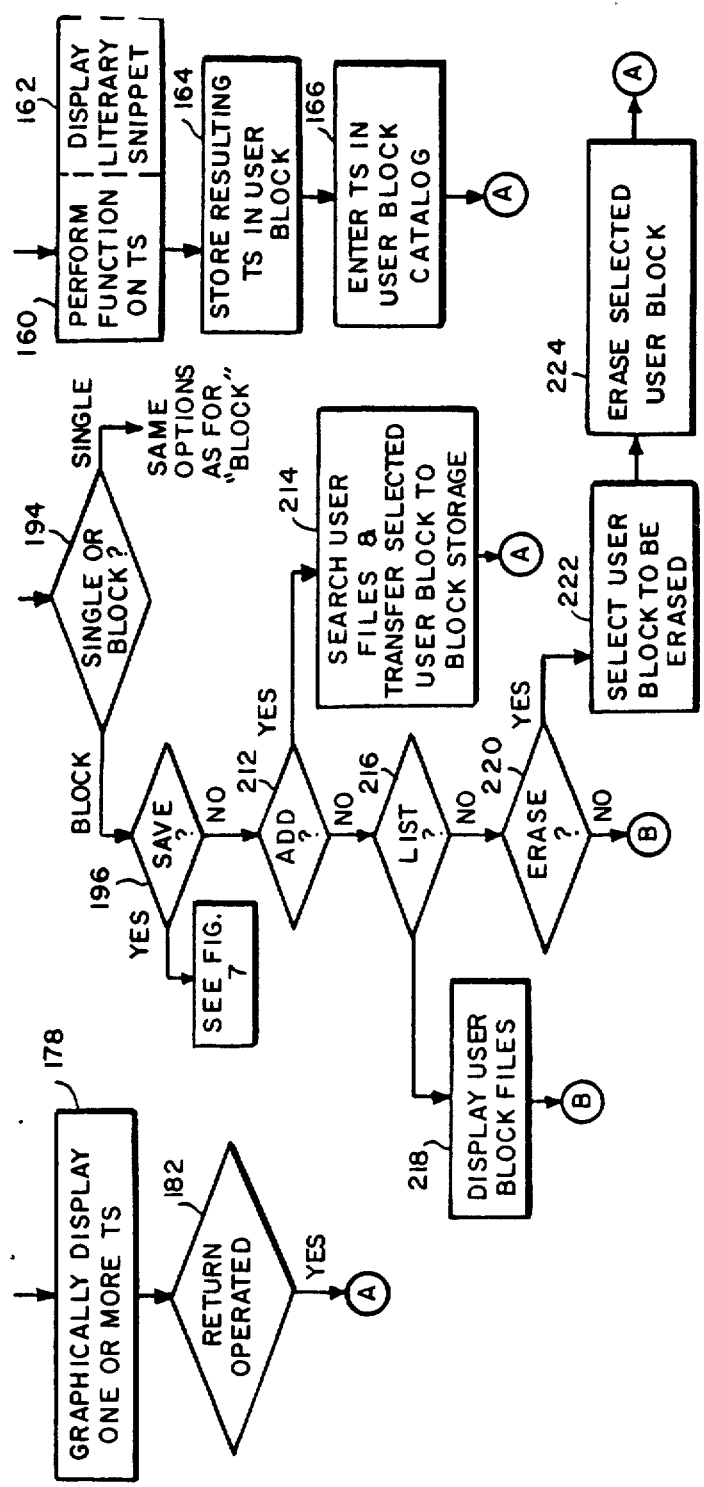

OPERATION:

FIG. 6 illustrates the basic operations of the system. Referring to FIG. 6, when the operation begins, the user is presented with the main menu display (step 100). For purposes of illustration, it will be assumed that this menu contains four options which are "catalog", "math", "graph", and "user". Since at the beginning of the operation, there will normally be no time series stored in memory 20, the first selection by the user from the main menu display will normally be "catalog" (step 102), this option permitting the user to load time series from bulk storage 18 to working storage 20.

If the user selects "catalog", the operation branches to step 104 (FIG. 5) wherein the first level of the time series collection catalog is transferred from catalog store 22 (FIG. 1) to temporary catalog storage 38 in storage 20. This causes the first level of the menu to be displayed on display 16. During step 106, the user makes a selection from this menu and during step 108 a determination is made as to whether a block menu is being displayed. Since initially a block menu is not being displayed, the operation proceeds to step 110 during which the appropriate next level menu is transferred from catalog area 22 to temporary catalog store 38 and is displayed. As was indicated previously, when this occurs, the previous menu stored in temporary catalog store 38 is not erased.

From step 110, the operation returns to step 106, during which the user again makes a selection, and then to step 108 during which a determination is made as to whether a block is now being displayed. While not shown in FIG. 5, at any level in the menu, the user can be given the option, in addition to the various topic options, of backing up one level in the index (see for example FIG. 4). If this option is selected during step 110, instead of loading the next level of menu into temporary catalog store 38, the menu at the preceding level still stored in the temporary catalog store would be utilized to control the display and the operation would return to step 106 for the user to make a selection. The sequence of operations described above is repeated until, during step 108, a determination is made that a block menu is being displayed. When this occurs, the operation branches to step 112 during which a determination is made as to whether "read notes" has been selected from the displayed block menu. If "read notes" has been selected, the operation proceeds to step 114 during which the user moves the cursor to a block indication or to a time series title for a selected one of the time series in the block and selects the block or the time series. During step 116 the notes for the selected block or time series are transferred from the time series collection 24 to temporary notes storage area 40 and are utilized to cause the display of the notes for the block or selected time series on display 16. The notes continue to be displayed until the user operates a return key on keyboard 14 (step 118), at which time the block menu is again displayed. At this time the user may select "read notes" again and cause the notes for a different time series or of the block to be displayed in the manner discussed or may select another option.

If another option is selected, the operation branches to step 120 during which a determination is made as to whether the user has selected the entire block. If the user has selected the entire block, during step 122 the block is loaded from storage area 24 to block storage area 44 (FIG. 1). During step 124 the available data menu 42 is updated to reflect the fact that the transferred block is now resident in the block storage area. From step 124 the operation returns to step 100 (FIG. 6) to cause a display of the main menu.

If during step 120 it is determined that the user has not selected "block", the operation proceeds to step 126 to determine if the user has selected "single time series". If the user has selected "single time series", the operation proceeds to step 128 wherein the user identifies the time series from the block which is to be transferred. During step 130 the selected time series is transferred from the appropriate block in storage 24 to user block 48 of storage 20. During step 132 the user block catalog portion 46 of the available data menu is updated by adding the title of the selected user block to this catalog. From step 132, the operation returns to step 100 (FIG. 6).

If during step 126 it is determined that the user has not selected "single time series", the operation proceeds to step 134 during which a determination is made as to whether "memory status" has been selected If "memory status" has been selected, the operation proceeds to step 136 during which the current load status of block store 44 is displayed in an appropriate form. For example, a display may be provided as to the number of available memory locations in block store 44. This display may either be a full display on the screen or may be a window which appears in the block menu display. From step 136, the user may either operate a return key (step 118) or, if the status is merely a window display, so that the block menu is still being displayed, the operation may return directly to step 112 to permit the use to make another selection from the block menu which selection automatically causes the window display of load status to be erased. At this point, the user may also be provided with the option of erasing one or more blocks in block storage 44. This option may be exercised either by operating appropriate keys on keyboard 14 and then operating a return key to get back to the block menu, or by causing the available data menu to appear with the display of current load status permitting the user to select erasure of blocks from block storage as an option and to select the blocks to be erased.

If during step 134 a determination is made that "memory status" has not been selected, the operation proceeds to step 138 to determine if "back-up" has been selected. If "back-up" has been selected, the operation proceeds to step 140 to cause the prior men level still stored in temporary catalog store 38 to be displayed As previously indicated, the user might select this option where he determines that the time series for the selected block are not appropriate for his problem and wishes to choose another topic from the prior menu without having to repeat the entire catalog selection process. From step 140, the operation returns to step 106 to permit the operator to make a selection from the prior level menu.

Figure 5:
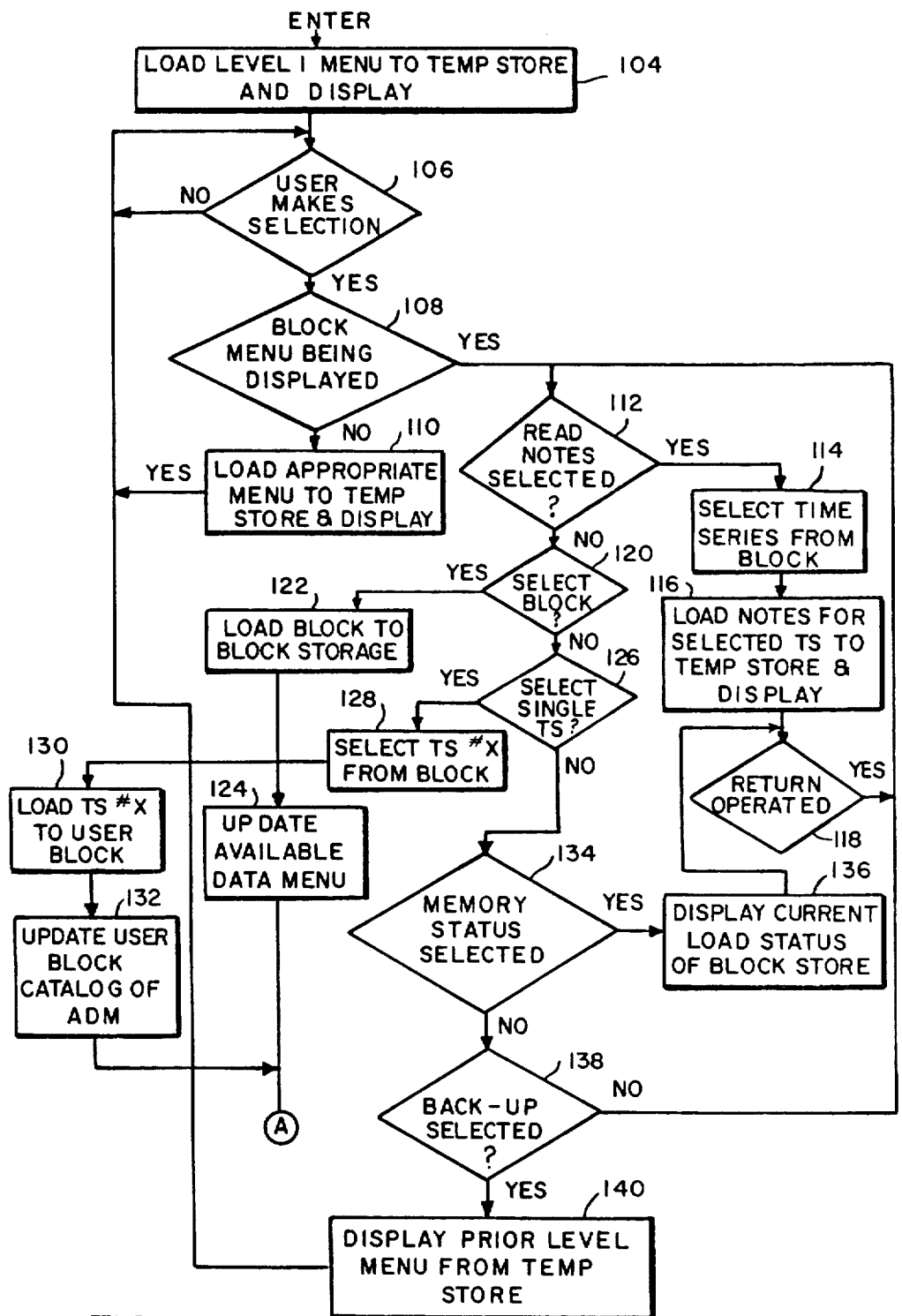
FIG. 5 is a flow diagram for the time series accessing function in accordance with a preferred embodiment of the invention.

If during step 138 it is determined that the user has not selected "back-up", it means that the user has not yet made a selection from the block menu and the operation returns to step 112 awaiting a selection by the user. It should be noted that the order in which steps 112, 120, 126, 134 and 138 are executed is not critical and the order shown in FIG. 5 is for purposes of illustration only. To assist the user in doing a catalog search, a window may be provided on display 16 which indicates to the user the sequence of catalog selections, which he has made to that point in the search. Alternatively, this display may be provided in response to a user request.

As was indicated above, once the transfer of a block or a single time series has been completed, the operation returns to step 100 (FIG. 6) to display the main menu. At this point, the user may again select "catalog" permitting him to load an additional block or additional time series into storage 20 or the user may make another selection from the main menu. Assuming that the user has loaded all required blocks and time series into store 20, the user might from step 100 proceed to step 150 to select "math". If during step 150 it is determined that the user has selected "math", the operation proceeds to step 152 to display the math function menu. While this menu may be a single menu displaying all possible math functions which can be performed by the system, it is preferably also a hierachical menu wherein a first level displays a plurality of higher level mathematical functions such as "moving statistics", "basic", "rate", or "other". Other may, for example, be logarithmic functions. If, for example, during the first level math function display, "moving statistics" is selected, the second level display might display the various moving statistics functions available such as "moving variance", "moving standard deviation", "moving covariance", and "moving correlation".

When the user makes a final selection of a function during step 154, the operation proceeds to step 156 during which the system provides the user with a prompt to select one or more time series from block storage 44 or user block 48. The user then proceeds to select the time series on which the math function is to be performed. Depending on the function, this may be a single time series or two or more time series. The time series are selected during step 158 by providing the user with a display of the block titles in the available data menu, the user block being one of the blocks in this menu. The user then selects the block containing the desired time series causing a display of the time series titles in the block to appear. From this menu of time series titles, the user selects the desired time series by moving the cursor to the time series title and operating an enter key or button. This sequence of operations may be repeated for one or more additional time series if required.

When the time series has been selected, the operation proceeds to step 160 to cause the selected math function to be performed on the selected time series. The manner in which the system operates to perform the various moving statistic or moving transformation functions will be described in greater detail hereinafter. Other functions which may be performed on the time series are standard and will not be described. However, one additional type of function is performed by this system in an unique way. These functions are various transformations or coversions which may be performed on a time series to put the time series in a more usable form, such as by converting it to other units. Such transformations may include, but are by no means limited to, transformations which convert the time series data to a percapita basis or to constant dollars adjusted for inflation. In accordance with the teachings of this invention, data necessary for performing such transformations is stored in area 36 of memory 20 as part of the shell or operating system so that the user may perform such transformations on a time series by merely selecting the transformation function, without the requirement of locating and transferring the appropriate time series for performing such transformation into the system. This significantly simplifies and speeds up the operation of the system in the performance of these common and useful operations. Since the normal transformations which a user may make will vary with the environment in which the system is being utilized, the user may be provided with the option of loading his own data into area 36 of the shell in addition to, or instead of, data provided in the shell from the system source.

One problem frequently encountered in performing analyses with time series is that the user becomes bogged down in numbers and starts operating with the analytic side of his brain rather than the creative side. To assist the user in avoiding getting into a rut, and to stimulate his creativity, the system avoids to a large extent displaying numbers, relying primarily on graphic displays to convey information. In addition, it has been found that the user's creativity can be stimulated by displaying esthetic images or literary snippets such as sayings, short poetry, haiku or the like at certain times in the system operation, such as while mathematical functions are being performed. These images or snippets, which may, for example, be windowed on display 16, serve to move the user's mental process from an analytical to a creative mode, serving as a trigger to the mind to make shifts in thought. The object is to dislodge the user from old patterns and expectations into creating new patterns and using intuitive processes. This function is illustrated by step 162 in the operation. These images literary snippets may be stored in any appropriate area of storage 20, may be randomly accessed where two or more are in the system and may be periodically changed so as not to become stale.

When the selected math function has been completed, the resulting time series is stored in user block 48 (step 164). During step 166, the user block catalog 46 is updated to reflect the new time series stored in the user block. This function may be performed by the user assigning a title to the new time series which title is stored in the catalog. However, it is preferable that this function be performed automatically, the system forming the new title from the math function performed and the title or titles of the time series involved in the performance of the function. From step 166, the operation returns to either step 100 to display the main menu (as shown) or to step 152 to permit another math function to be selected.

At this point, the user may again make any of the selections available from the main menu. Assuminq at this point that the user wishes to display in graphic form one or more of the time series stored in block storage 44 or user block 48, a "yes" output is obtained during step 168 which causes the operation to proceed to step 170 to display a qraph menu. As with step 152, all available qraph options may displayed on a single menu or a hierarchy of graph menus may be provided from which the user may ultimately select the desired graphing option. When, during step 172, the user selects a desired graphing option, the operation proceeds to step 174 during which the user is prompted to select one or more time series from the block storage or user block to be graphically displayed. The user selects the time series during step 174 in the same manner that time series were selected during step 156 from displays of the available data menu.

When, during step 176, a determination is made that the user has selected all of the time series to be graphically displayed, the operation proceeds to step 178 to graphically display such time series. FIG. 10 is a diagram illustrating one possible such graphic display. In particular, this figure shows that two or more time series may be simultaneously displayed on a single qraph. When this is done, each graph has a different symbol, such as a square, circle, diamond or the like. An index 179 is provided in a window on the display which indicates the symbols and a short title for each time series being graphed.

Where the scales for such time series differ substantially, so that, if both time series were shown on the same scale, one display would be meaningless or it would be difficult to show both time series on the same scale, one of the time series may be multiplied by a constant so as to bring the two time series onto the same scale. This multiply-by a-constant function may be performed either in response to a user input or may be performed automatically by the system in response to a determination by the system that the average values of the two time series are substantially different. The determined average values may be utilized to select the constant by which one of the series needs to be multiplied in order to permit both series to be displayed on the same scale. The scaling factor may thus be A1/A2 where A1 is the average value of the series not to be scaled and A2 is the average value of the series to be scaled. While this operation may distort the absolute value of a displayed time series, frequently it is the relationships of the displayed time series which is of interest, not their absolute values. The scaling function permits these relationships to be more easily perceived.

FIG. 10 also illustrates another feature of this system which is referred to as the "X-axis current feature" and which permits the showing of different periodicities of a particular series on the same scale. Thus, the qraph of both functions show annual values up until 1984 and, shows quarterly values from 1985 through 1987. This feature may be useful in reviewing certain types of data. The graphic display selected by the user continues to be displayed until the user operates the return key (step 182) at which time the operation either returns to step 100 (as shown) to again cause the main menu to be displayed or to step 170 to permit a new graphic display to be selected.

The final choice on the main menu is "user". If during step 186 it is determined that the user has selected this option, the operation proceeds to step 188 to display the user menu. As for the prior menus for the main menu options, all of the user options may be in a single menu, or a hierarchy of user menus may be provided to permit the user to select a desired option. One of the options which can be selected from the user menu, and the only option which will be described in detail is the option designated "file". If during step 190 a determination is made that "file" option has not been selected, the operation proceeds to step 192 to see if one of the other available options has been selected and, if so, to execute such option. Such options may include, but are by no means limited to, a "go to" or "return" option which causes the operation to return to step 100 to display the main menu; a "list" option which causes a display on monitors of the user block catlog 46; a "delete" option which causes a display of the user block catalog 46 and permits any time series stored in the user block to be erased by moving the cursor to the the time series title for the time series in the catalog display and operating the entered key; and a "clear" option which causes the entire user block to be erased. When any of these options have been performed, the operation either returns to step 100 as shown or to step 188 to cause the user menu to again be displayed.

If a "yes" output is obtained during step 190, the operation proceeds to step 194 during which a selection is made as to whether an operation is to be performed on a block or on a single time series. If during step 194 a determination is made that a block is to be operated on, the operation proceeds to step 196 to determine if the block is to be "saved". From FIG. 6 it is seen that when the "block" option is selected, a menu appears which offers, for example, four options which are indicated as "save" "add", "list" and "erase". While these options are being shown as being looked at in a particular sequence in FIG. 6, this sequence is for purpose of illustration only and is in no way a limitation on the invention. If during Step 196, a determination is made that the user block is to be saved, this means that a user generated block of time series, which presumably relate to a particular subject or problem is to be transferred from user block 48 in storage 20 to user blocks area 26 in store 18. This enables the user to produce his own storage blocks which relate to a subject of interest to him and permits him to quickly and easily retrieve such block at a later time, avoiding the necessity of collecting required time series from the time series library 24 and of regenerating time series which the user had previously generated by performing a math function on one or more time series.

If a "yes" output is obtained during step 196, the operation proceeds to step 200 (FIG. 7) to provide the user with a prompt as to whether any of the time series then in the user block should be erased. The prompt may contain an erase indication and a listing of the titles from the user block catalog 46. The user may for example erase a time series by striking the "enter" key or button when the cursor is adjacent the erase prompt. This causes the cursor to move to the user block catalog titles. The user then advances the cursor to the title of the time series which he wishes to erase and operates the "enter" key or button, causing the selected time series to be erased.

When the user has erased all time series which he wishes to erase, or if the user does not wish to erase any time series, the user may hit a return key or move the cursor to a return indication, causing the operation to advance to step 202 during which the user is provided with a prompt to add desired time series to the user block and the available data menu appears on the screen. If the user operates the "enter" key, indicating that he wishes to transfer one or more time series, the cursor advances to the available data menu. The user then selects the block in which the time series which he wishes to transfer appears causing the block menu for that block to appear on display 16. The user then advances the cursor and hits the "enter" key to cause one or more desired time series from the block to be transferred from bulk storage 44 to the user block 48. The first time a return key is operated, or a return operation is selected, the available data menu is again displayed permitting the user to select another block from which a time series may be selected to be stored. The user may then either select an additional time series to be transferred to the user block in the manner described above, or may operate return again causing the operation to proceed to step 204. An alternative to step 202 the user may transfer desired time series directly from TSC Storage 24 to user block 48 in the manner previously described.

Figure 7:
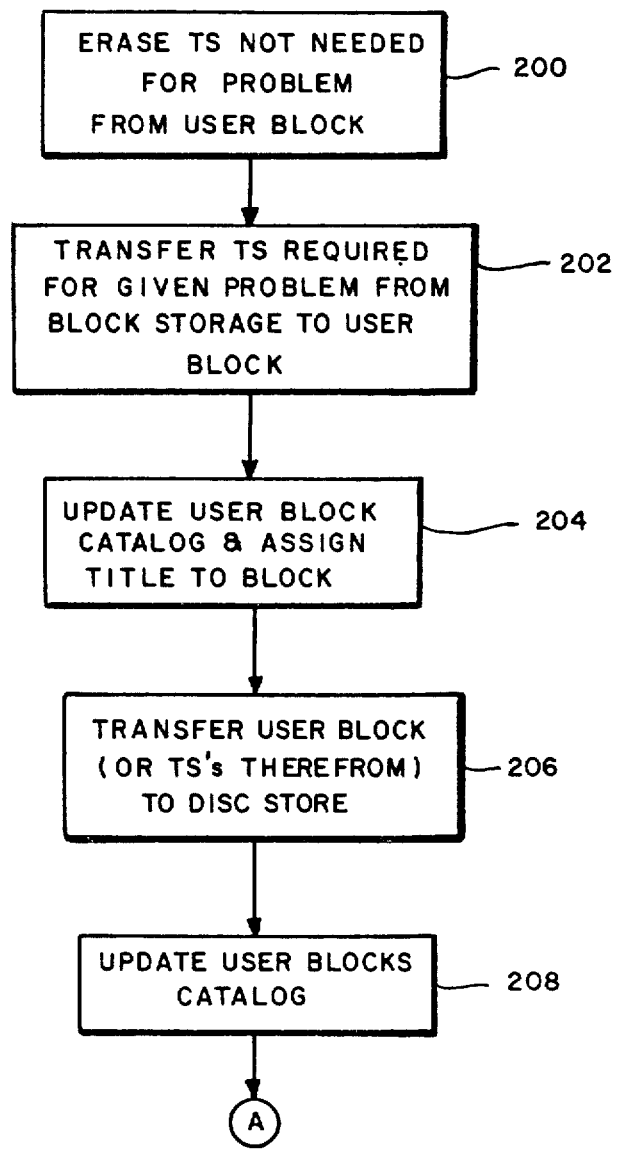
FIG. 7 is a more detailed flow diagram of the "Add User Block" function in accordance with a preferred embodiment of the invention.

During step 204 the user block catalog area of the available data menu is updated to remove user block titles which were erased during step 200 and to add time series titles for time series transferred to the user block during step 202. While a single update user block catalog step 204 is shown in FIG. 7, it is apparent that an update to remove titles of erased time series may be performed between steps 200 and 202 so that only the entry of titles for time series transferred into the user block during step 202 would be performed during step 204. While the update of user block catalog 46 may be performed manually by the user, it is preferably performed automatically by the system, the system recognizing the time series which have been erased or transferred and making appropriate updates in the user block catalog. Such an update would be performed whenever user block time series is added or erased even though such updates have not always been mentioned herein. During step 204 the user also selects a title for the block of time series in user block 48 which is meaningful to him and stores this title with the user block. Again, the system may assign a title to the user block, but it is considered preferable to have this function performed by the user. When the user assigns a title to the user block, the system may check to be sure that this title is not the same as a title for another user block already in the system and alert the user if such duplication exists.

From step 204, the operation proceeds to step 206 to transfer the contents of user block 48 to user blocks area 26 of store 18. Once step 206 has been completed, the operation proceeds to step 208 to update the use block catalog 28 by adding the title for the transferred user block to this catalog. From step 208 the operation either returns to step 100 as shown to display the main menu or to step 188 to display the user menu.

If during step 196, a determination is made that "save" has not been selected, the operation proceeds to step 212 to determine if "add" has been selected. If add has been selected, this means that one or more user blocks stored in area 26 of store 18 are to be transferred to block storage 44 and the operation proceeds to step 214 during which a catalog search from user files is performed. Since this operation is in many ways similar to the catalog search previously described in conjunction with FIG. 5, this operation will not be described in detail. The user blocks are not normally cataloged by subject matter but are merely sequentially stored as a menu of available user blocks (however, the user may set up his own topical index for user blocks if desired). Therefore, the first operation during step 214 is to cause the contents of the user block files to appear on display 16. This is accomplished, for example, by transferring the user block files to temporary catalog storage area 38 of storage 20. Once the user selects a block title from the file display, the block menu for that block is displayed and the remainder of the operation is substantially the same as the operations performed during steps 112-140 in FIG. 5. This permits the user to easily transfer all of the time series relevant to a particular problem he is workinq on to block store 44 or to easily locate and retrieve any desired time series from such block. When step 214 has been completed, the operation again returns to either step 100 or step 188.

If a no output is obtained during step 212, the operation proceeds to step 216 to determine if "list" has been selected. If "list" has been selected, the user block file from area 28 of store 18 aren't displayed during step 218. From step 218, the user may return to step 188 by operating a return key or by other suitable means.

If a "no" output is obtained during step 216, the operation proceeds to step 220 to determine if "erase" has been selected. If a yes output is obtained during step 220, the operation proceeds to step 222 during which the user block files are displayed and the user may select a block to be erased in user blocks 26 by moving the cursor to the appropriate block title in the user block files. During step 224, the next step in the operation, the user then operates the entered key causing the selected block to be erased. From step 224, the operation either returns to step 100 as shown or to step 188. If a no output is obtained during step 220, the operation also returns to step 180.

If during step 194 it is determined that the user has selected "single" sequence of operations substantially the same as that described when "block" was selected is performed. In particular, the user is presented with the same four options, namely "save", "add", "list", and "erase". The only difference is that in save, the user selects only a single time series from the user block to be saved in area 26 of store 18. In this case, steps 200, 202, and 204 in FIG. 7 would normally not be performed. If add is selected, the user time series file rather than the user block file from user files 28 is displayed, the user selects a single time series from this list and this time series is transferred to the user block area 48 in the matter previously discussed in connection with the transfer of time series from TSC storage area 24. The list and erase functions are also performed in the same manner as described with respect to block except that it is the user time series file rather than the user block file which are displayed in each instance.

Moving Transformations:

As previously indicated, in addition to various standard math functions which the system is adapted to perform, the system is also adapted to perform a variety of moving statistical transformations. While some prior art systems have performed a moving average function, such operation is performed on single time series and the results of such operation is in the same units and is generally in the same form as the original time series. Such a moving average calculation is intended and is performed primarily for the purpose of smoothing or modeling data, rather than for the purpose of providing a visual tool and obtaining new information. By contrast, the moving transformations performed by this invention result in new information being made available to the user, such new information providing either a moving numeric relationship between two or more time series or providing a moving numeric indication with respect to a single time series. The reason why moving transformations are important is that the global number provided by the standard statistical transformation is too broad an indicator to show variations at certain times. Moving transformations can provide such indications. For example, moving variance or moving standard deviation provide an indication of the volatility or stability of the factor reflected by the time series during the time period of the series.

Thus, for purposes of this invention, the term "moving transformation" shall mean an operation on one or more time series which provides new numeric information concerning such time series or the relationship of the two or more time series on a moving basis. More particularly, a span period (n) is selected, and for each time point of the time series (starting with the first time point for which time series values fit completely within the span), the indicated function is computed for such one or more time series over the selected span. The point for which the calculation is made may be at either end of the span or at some intermediate point of the span. The results of such calculations at the successive time points of the time series is a new time series which provides a moving indication of the particular function of the one or more time series.

For illustrative purposes, the invention is described with respect to the performance of moving variance or moving standard deviation on a single time series and moving covariance or moving correlation on two or more time series. As is well known, variance (biased) is equal to the sum of the squared distances of values from the mean of the values divided by the span (n). The equation for variance (V) is thus:

$$V = \frac{1}{n} \sum_{i=1}^{n} [X(i) - \overline{X}]^2 \quad (1)$$

where X(i) is the value of the time series at time point (i) and $\overline{X}$0 is the mean value of the time series values over the span (n).

Similarly, the equation for variance (unbiased) is:

$$V = \frac{1}{n-1} \sum_{i=1}^{n} [X(i) - \overline{X}]^2 \quad (1')$$

Thus, to compute moving variance, at each point for which the moving variance is to be computed, the means of the values for the span for that point is computed, the difference between the value of each point within the span and the determined means value is computed and squared and the resulted squared values are summed. This value is then divided by (n) or (N−1) and the resulting value is stored as the (n) period variance for the time series at the given data point of the time series.

Similarly, standard deviation (s) is the square root of variance. Thus:

$$S(\text{biased}) = \sqrt{\frac{1}{n} \sum_{i=1}^{n} [X(i) - \overline{X}]^2} \quad (2)$$

$$S(\text{unbiased}) = \sqrt{\frac{1}{n-1} \sum_{i=1}^{n} [X(i) - \overline{X}]^2} \quad (2')$$

The advantage of standard deviation over variance in seeing patterns is that it gives values in the same range as the original values. As previously indicated, both moving variance and moving standard deviation are useful in seeing the degree of variation of the values over time, thus permitting the user to identify periods of volatility and stability.

Figure 8:
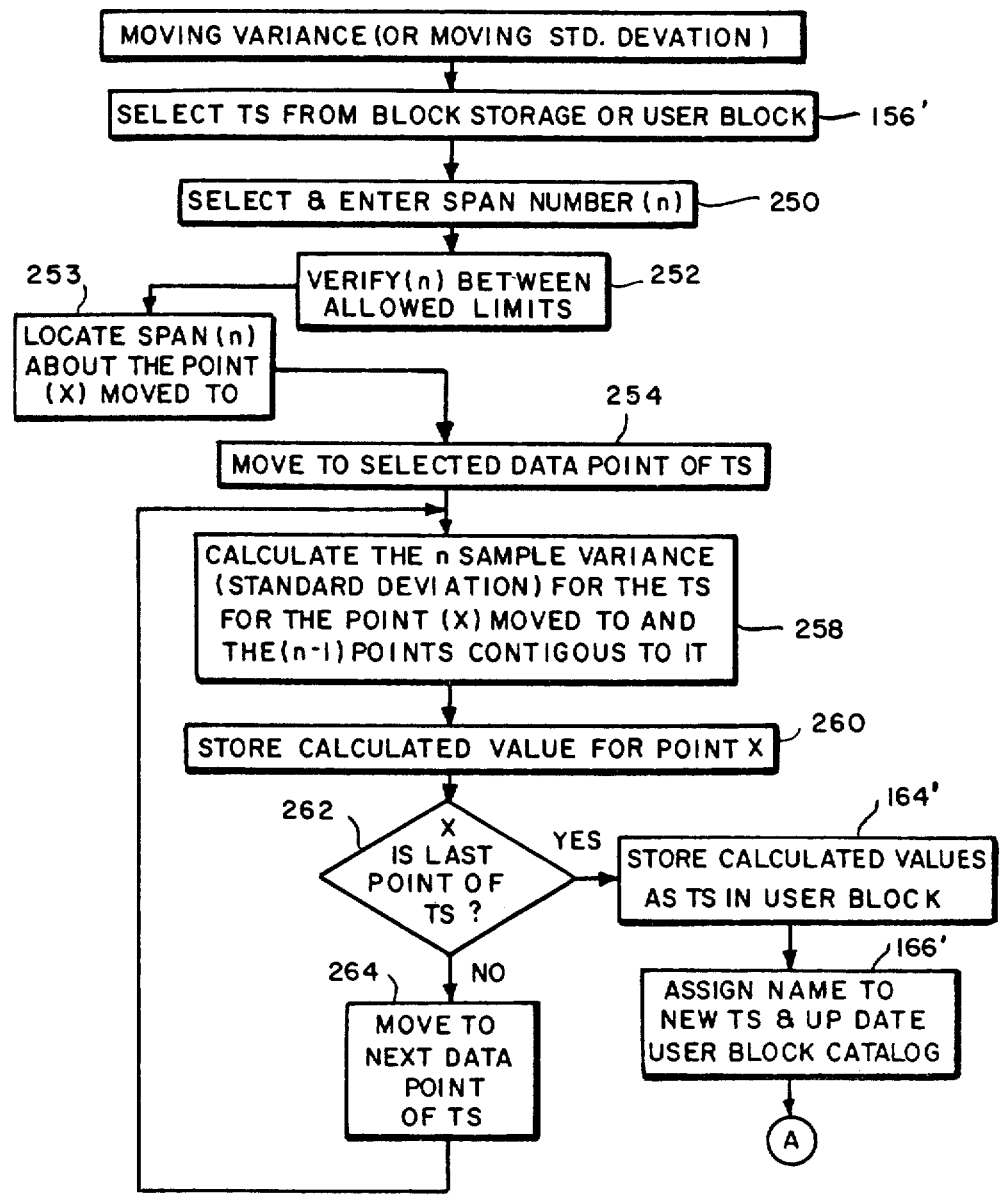
FIG. 8 is a flow diagram of the "Moving Variance" (or "Moving Standard Deviation") function in accordance with a preferred embodiment of the invention.

FIG. 8 is a flow diagram illustrating the sequence of steps which is performed in order to perform a moving variance or moving standard deviation function in accordance with the teachings of this invention. When during step 154 (FIG. 6) the user selects the moving variance (or moving standard deviation) function, the operation proceeds to step 156' (FIG. 8) to select a time series on which the function is to be performed from either block storage 44 or user block 48. Step 156' corresponds to step 156 in FIG. 6 and is performed in the same same manner described in detail with respect to FIG. 6.

When step 156' has been completed, the operation proceeds to step 250 to select and enter a span number (n). This function may be performed in a number of ways. For example, a screen prompt may advise the user to select a span number and the user may select this number by entering an appropriate numeric value from the keyboard. In the alternative, on the screen with the select spa number prompt may appear a sequence of numbers which are the allowed span values in the system. The user may then advance the cursor to the desired number and operate the "enter" key or button to enter the desired span number.

Once the span number has been selected, the operation proceeds to step 252 to verify that the span number (n) is between allowed limits. Allowed limits may, for example, be two to 125. If the span number is selected using the second technique indicated above where only valid span numbers are offered to the user, step 252 may not be required.

During the next step in the operation, step 253, a selection is made as to where the span (n) is to be located about a point X for which each calculation is made. As previously indicated, the point X may be at the beginning, the end, or anywhere in the middle of the span.

During the next step in the operation, step 254, the operation moves to a selected data point of the time series. For the preferred embodiment, the selected data point is the first data point of the time series which permits the span (n) to be completely filled by data points of a time series. Thus, for example, if the span was the point X and the (n−1) point preceding point X, the initial selected data point of the time series would be (n). Similarly, if the span is the point X and the (n−1) points following point X, the selected data point at which the operation would begin would be the first data point of the time series. With the span otherwise positioned around the data point X, the initial point for computing variance or standard deviation would be a point midway between the first and (n) point of the time series.

From step 254, the operation proceeds to step 258 to compute the (n) period variance (or standard deviation) for the time series for the point X and the (n-1) points contiguous thereto in the span. The (n) period variance for the point X would be computed using equation (1) (or (1')) above for the (n) points of the span while the (n) period standard deviation would be computed using equation (2) or (2') above for the (n) points of the span. During step 260, the resulting value is stored in an appropriate temporary store.

During step 262, the next step in the operation, a determination is made as to whether the point X at which the last calculation was made is the last point of the time series. If point X is not the last point of the time series, the operation proceeds to step 264 to move to the next data point of the time series. The operation then returns to step 258 to calculate the (n) period variance or standard deviation for the new point X and step 260 to store this calculated value.

This sequence of operations is repeated until, during step 262, a determination is made that the point X for which the last calculation was made is the last point of the time series. When this occurs, the operation branches to step 164' to store the calculated values as a time series in user block 48. This is accomplished in the same manner as was discussed in conjunction with step 164 in FIG. 6. Similarly, the next step in the operation, step 166', the assigning of a name to the new time series and the updating of the user block catalog, is performed in substantially the same way described in conjunction with step 166 in FIG. 6. From step 166', the operation returns either to step 100 as shown or to step 152.

Similarly, moving covariance and moving correlation may be computed and utilized to provide an indication of relationship between two time series. In theoretical form covariance between two time series is basically the sum over the span, or other area of interest, of the product of (a) the difference between each point within the span from the mean of the points of the span of the first series and (b) the difference of each point on the span from the mean of the span for the second series. In reduced form for computational purposes, the equation for covariance is:

$$CV(i) = \frac{1}{n} \sum_{i=1}^{n} [X(i)Y(i)] - XY \tag{3}$$

Correlation may be considered to be equal to the covariance as computed above divided by the product of the standard deviations of the two time series (either in biased form as shown below or in unbiased form). Thus, the equation for correlation is:

$$CR(i) = \frac{CV(i)'}{\text{Std Dev } X * \text{Std Dev } Y} = \tag{4}$$

$$\frac{\frac{1}{n} \sum_{i=1}^{n} [X(i)Y(i)] - XY}{\sqrt{\frac{1}{n} \sum_{i=1}^{n} [X(i) - X]^2} \sqrt{\frac{1}{n} \sum_{i=1}^{n} [Y(i) - Y]^2}}$$

While equations (3) and (4) illustrative covariance and correlation for two time series, these equations may be generalized to provide covariance and correlation for three or more time series. In the discussion to follow, it will therefore be indicated that these moving transformations may be determined for two or more time series.

Figure 9:
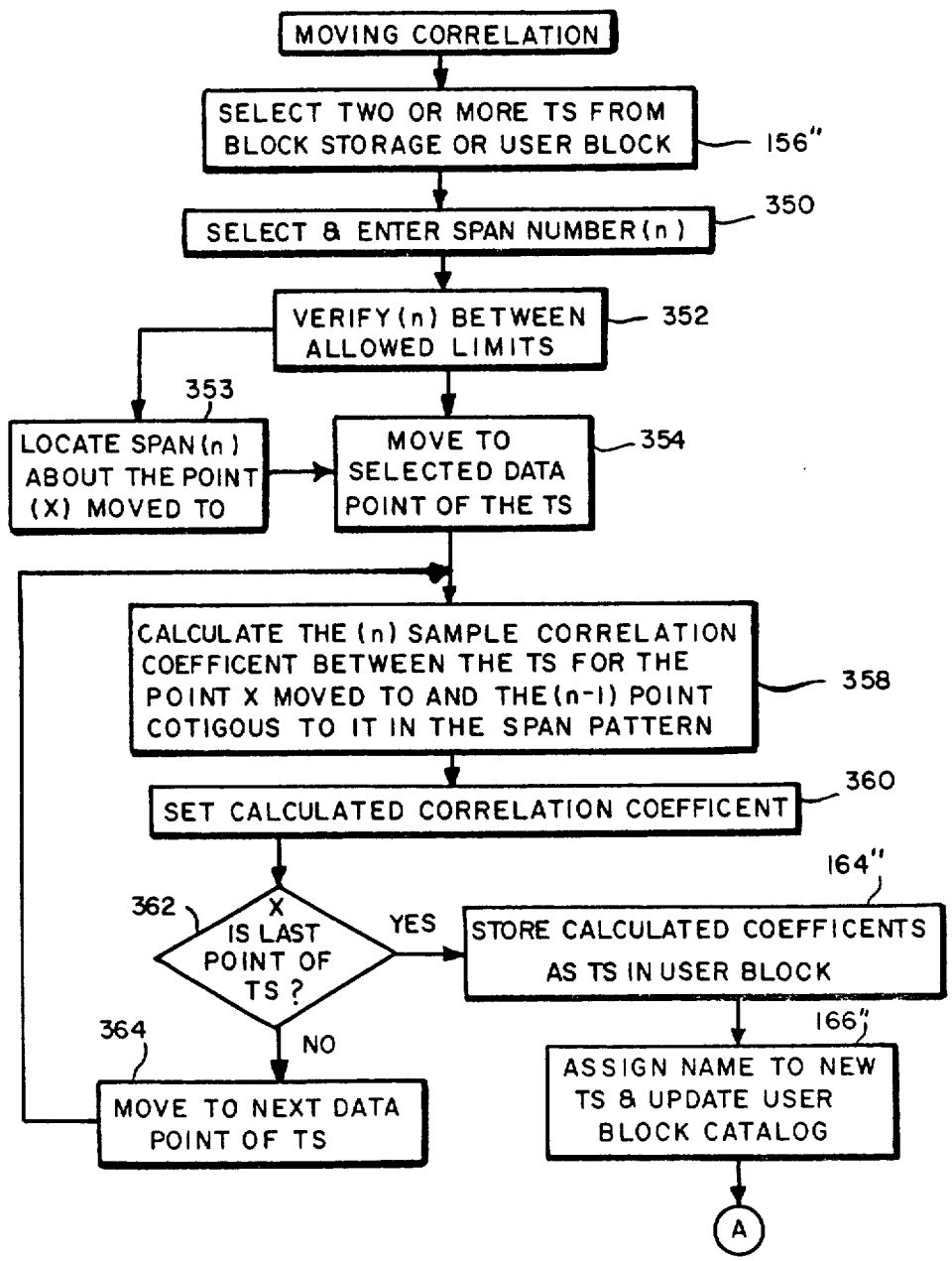
FIG. 9 is a flow diagram of the "Moving Correlation" function in accordance with a preferred embodiment of the invention.

FIG. 9 is a flow diagram illustrating the sequence of steps which may be performed to determine moving correlation for two time series. The same sequence of steps would be performed for performing moving covariance except that the operation performed during the calculating step would be for covariance rather than for correlation. Again, FIG. 9 is entered from block 154 of FIG. 6 when the math function selected by the user is moving correlation. The first step in this operation, step 156", is to select the two or more time series from block storage or user block which are to be used in performing the moving correlation function. This selection function is performed in substantially the same manner as described in detail in conjunction with step 156 in FIG. 6.

From step 156", the operation proceeds to step 350 during which a span number (n) is selected and entered. This operation is performed in the same manner as step 250 in FIG. 8. Similarly, step 352, the next step in the operation, to verify that the span number (n) is between the allowed limits, it is performed in the same manner as step 252 in FIG. 8 and may not be required if the span number is selected from a cursor menu, and step 353, the locate span step, is performed in the same manner as step 253 in FIG. 8.

From step 353, the operation proceeds to step 354 during which the operation moves to a selected data point of the two time series to begin the operation. As has been indicated in greater detail in connection with step 254, the selected data point moved to is the first point on the time series where the span will be filled by data points of the time series. During the next step in the operation, step 358, the (n) period correlation coefficient between the two or more time series for the point X and the (n−1) points contiguous to it in the span pattern is calculated in accordance with equation (4) above. During step 360, this value is stored in a temporary store and during step 362 a determination is made as to whether the point for which the calculation was made is the last point of the time series. If during step 362 a determination is made that the point is not the last point in the time series, the operation proceeds to step 364 to move to the next point of the time series and then returns to step 358 to calculate the correlation coefficient for this new point. Steps 358, 360, 362 and 364 are repeated for succeeding data points along the time series being correlated until, during step 362, a determination is made that the point for which the last calculation was made is the last point of the time series. When this occurs, the operation branches to step 164″ to store the calculated coefficients as a time series in the user block and to step 166″ to assign a name to the new time series and update the user block catalog. These steps are performed in a manner previously discussed. From step 166″, the operation returns to step 100 to display the main menu.

While in describing the operations of FIG. 8 and FIG. 9, during steps 254 and 354, respectively, the operation started at a selected data point for which the span was filled by data points, it is possible by modifying the calculations using missing values techniques for the first few data points to always start the computations at the first data point of the time series. However, since certain assumptions need to be made in order to do this, which assumptions may not be completely valid, it is not certain that the data for these points will be either accurate or necessary and these points ar therefore normally ignored.

A system has thus been provided which affords the user great flexibility in exercising his creativity to locate and access time series of interest to a problem which he is working on and to manipulate such time series to obtain more useful information, while still permitting the user to easily and quickly access all desired information.

While the invention has been described above with respect to a preferred embodiment, it is apparent that the foregoing other changes in form and detail may be made therein by one skilled in the art without departing from the spirit and scope of the invention. In particular, while for the preferred embodiment the various functions of the invention have been shown as being performed by a programmed general purpose computer, it is apparent that special purpose hardware could be developed to perform one or more such functions or that all such functions could be performed by special purpose hardware. Further, while for the perferred embodiment CPU 12 has been indicated as a personal computer, it is apparent that any data processor having adequate computing capacity could be used for performing this function and that CPU may either be dedicated for this function or that the function may be performed as one of many functions available from a particular system. It is also possible that the CPU could be a main frame computer which users would access on a time share basis from appropriate terminals or workstations. Similarly, while two separate memorys 18 and 20 have been shone and memory 18 has been indicated as being an offline device, it is conceivable that in a large system having sufficient memory capacity, a single memory could be utilized, in which case box storage area 44 might not be required. However, user block 48 would still be required. Similarly, while thought the discussion it has been indicated that menu selections are made by means of a cursor, it is possible that menu selections could be made in some other manner such as by voice response while still remaining within the teachings of this invention. At least some of the teachings of this invention could also be practiced where the accessing of the memory is accomplished in a manner other than through a hierarchical multilevel menu, although this is clearly the preferred embodiment. A search could, instead, be made by for example key word.

Finally, while the invention is particularly adapted for use with time series, it may also be utilized with other ordered sets of numbers where the intervals between numbers represent something other than time. For example, these set of numbers could represent a variation in a certain chemical property with variations in temperature, could indicate mileage figures for different speeds for a given automobile or could be some other ordered set of numbers. Therefore, as used in this application, the term "time series" shall be construed to include such other ordered sets in addition to standard time series.

The attached as an appendix to this application, which appendix can be found in the application file, is a program listing for a preferred embodiment of the invention written in Macro language to run on a Lotus 123 spread sheet.

What is claimed is:

1. A system for facilitating a user accessing and manipulating time series comprising:
    first means for storing a plurality of blocks of time series each of which blocks contains a number of time series;
    means for cataloging said time series in a hierarchial multilevel menu form by subject matter,
    means responsive to a user access request for providing the user a first subject matter menu from said cataloging means;
    means response to a user selection from the first and each successive subject matter menu for providing the user a successive level of subject matter menu;
    means responsive to a user selection from a predetermined menu level for providing the user with time series identifications for a block stored in said first storing means;
    second means for storing a plurality of time series, a predetermined area of said second storing means having capacity to store a number of time series and being designated as a user area;
    means responsive to a user selection from the time series identifications for a block for transferring selected time series from the first storing means to the second storing means;
    means responsive to user requests for performing predetermined functions on one or more time series stored in said second storing means;
    means for storing the results of each function performed in said user area;
    means for cataloging time series stored in said user area; and
    means for selectively transferring time series stored in said user area to said first storing means.

2. A system as claimed in claim 1 wherein up to a fixed number of time series are permitted in a block, and wherein the number of time series which said user area is adapted to store is said fixed number, whereby a user block may be stored in said user area.

3. A system as claimed in claim 2 wherein said means for selectively transferring may transfer a single time series from said user area or the entire user block.

4. A system as claimed in claim 3 including means for storing in said user area selected time series originally transferred from said first storing means, whereby a particular user block may contain all time series needed by the user for a particular project.

5. A system as claimed in claim 1 including means operative at selected times for providing the user with material not directly related to the time series being accessed or the manipulation thereof, which material is adapted to stimulate the user's creativity in the use of the system.

6. A system as claimed in claim 5 wherein the material provided to the user is in the form of literary snippets.

7. A system as claimed in claim 1 wherein the means for transferring time series from the first storing means to the second storing means includes means responsive to a user request for transferring all of the time series for the block being provided 8. A system as claimed in claim 1 wherein said function performing mean includes means for performing a moving transformation on said one or more time series.

9. A system as claimed in claim 8 wherein the means for performing a moving transformation includes means for identifying one or more time series on which the transformation is to be performed, said time series being formed of a plurality of data points, means for selecting a span number of periods (n), means for locating the span about a data point (x) of the time series, and means operative at each data point (x) of the time series, starting with a selected data point, for calculating the transformation of the time series for the data point x and the other (n−1) data points of the located span.

10. A system as claimed in claim 8 wherein the moving transformation performed is moving variance.

11. A system as claimed in claim 10 wherein the means for performing a moving transformation includes means for identifying a time series on which the transformation is to be performed, said time series being formed of a plurality of data points, means for selecting a span number of periods (n), means for locating the span about the data point (x) of the time series, and means operative at each data point (x) of the time series, starting with a selected data point, for calculating the variance of the time series for the data point x and the other (n−1) data points of the located span.

12. A system as claimed in claim 8 wherein the moving transformation performed is moving standard deviation.

13. A system as claimed in claim 12 wherein the means for performing a moving transformation includes means for identifying a time series on which the transformation is to be performed, said time series being formed of a plurality of data points, means for selecting a span number of periods (n), means for locating the span about a data point (x) of the time series, and means operative at each data point (x) of the time series, starting with a selected data point, for calculating the standard deviation of the time series for the data point x and the other (n−1) data points of the located span.

14. A system as claimed in claim 8 wherein the moving transformation performed is moving correlation between at least two time series.

15. A system as claimed in claim 14 wherein the means for performing a moving transformation includes means for identifying at least two time series on which moving correlation is to be performed, said time series being formed of corresponding data points, means for a selecting span number of periods (n), means for locating the span about a data point (x) of the time series and means operative at each data point of the time series, starting with a selected data point, for calculating the correlation of the at least two time series at the data point x and the other (n−1) data points of the located span.

16. A system as claimed in claim 8 wherein the moving transformation performed is moving covariance between at least two time series.

17. A system as claimed in claim 16 wherein the means for performing a moving transformation includes means for identifying at least two time series on which moving correlation is to be performed, said time series being formed of corresponding data points, means for selecting a span number of periods (n), means for locating the span about a data point (x) of the time series and means operative at each data point of the time series, starting with a selected data point, for calculating the covariance of the at least two time series at the data point x and the other (n−1) data points of the located span.

18. A system as claimed in claim 1 wherein each of said time series is formed of a plurality of data points, each of said data points corresponding to a particular point in time; and wherein said function performing means include, a data processing means having a shell operating system, means for storing as part of said shell operating system conversion data for a plurality of time points for at least a selected function, and means for utilizing the stored conversion data for each time point to transform the corresponding data point of a time series.

19. A system as claimed in claim 18 including means for adding transformation function to be performed by the system, said adding means including means for adding corresponding conversion data to said shell operating system for performing such function.

20. A system as claimed in claim 1 including means for storing notes with a block, said notes concerning at least the block and/or selected ones of the block time series;

wherein said indentifications provided for a block include a notes identification; and including means responsive to the user selection of said notes identification and to a block or a time series identification for providing to the user notes on the user selection.

21. A system as claimed in claim 1 including means operative at at least a selected menu level for permitting the user to back up to the previous menu level provided to him.

22. A system as claimed in claim 21 including means for temporarily storing the men level being provided to the user; and wherein said means for permitting the user to back-up includes means for also storing the preceding menu provided to the user in said temporary storing means.

23. A system as claimed in claim 1 wherein said time series identification is a full title of the time series.

24. A system as claimed in claim 2 including means for separately cataloging user blocks transferred to said first storing means.

25. A system as claimed in claim 3 including means for separately cataloging time series from the use area which are transferred to said first storing means.

26. A system as claimed in claim 1 wherein the number of items in a menu and the number of time series in a block are limited so as to not overload the user in making a decision.

27. A system as claimed in claim 1 including means responsive to user inputs for graphically displaying one or more time series stored in said second storing means, including time series stored in said user area.

28. A system as claimed in claim 27 including means for graphically displaying two or more time series on the same graph; and means for scaling at least one of the time series to facilitate the viewing of the two or more time series on the same graph.

29. A system as claimed in claim 28 wherein each time series contains a sequence of values for successive time points; and
wherein said means for scaling includes means for multiplying the values of the time series to be scaled by a factor equal to the average value of the not to be scaled time series, divided by the average value of the time series to be scaled.

30. A system as claimed in claim 27 including means for presenting a first portion of the graphic display of a time series with a given time interval between data points and for presenting a second portion of the graphic display for the time series with a different time interval between data points.

31. A system for facilitating a user reconfiguring time series from a collection of time series stored in a collection storing means comprising:
a storing means having a user area for storing a plurality of time series;
means for storing selected ones of said time series in said user area;
means for performing predetermined functions on one or more time series;
mean for storing the results of functions performed in said user area;
means for indexing time series stored in said user area; and
means for selectively transferring time series stored in the user area to the collection storing means.

32. A system as claimed in claim 31 wherein said collection storing means has an index for the collections of time series and a user time series storing area;
wherein time series transferred from the user area are transferred to said user time series storing area of the collection storing means; and
including means for separately indexing time series stored in said use time series storing area.

33. A system as claimed in claim 32 wherein time series are stored in said collection storing means in blocks of related time series;
wherein said user area is adapted to store a block of time series wherein said transferring means may transfer either a selected one or more time series from said user area or the entire block in the user area; and
wherein said means for separately indexing includes means for separately indexing single series and entire blocks transferred to said user time series storing area.

34. A system for performing a moving transformation on one or more time series, each of which time series is formed of a plurality of data points, comprising:
means for identifying and storing the one or more time series on which the moving transformation is to be performed;
means for selecting a span number of time periods (n);
means for locating the span about a data point (x) of the time series; and means operative at each data point (x) of the time series, starting at a selected data point for calculating the transformation of the time series for the data point (x) and the other (n−1) data points of the located span.

35. A system as claimed in claim 34 wherein the moving transformation performed is moving variance.

36. A system as claimed in claim 34 wherein the moving transformation performed is moving standard deviation.

37. A system as claimed in claim 34 wherein the moving transformation performed is moving correlation between at least two time series.

38. A system as claimed in claim 34 wherein the moving transformation performed is moving covariance between at least two time series.

39. A system for performing a selected transformation of a time series formed of a plurality of data points, each of said data points corresponding to a particular point in time, comprising:
a processor having a shell operating system;
means for storing as part of said, shell operating system conversion data relating to said transformation for a plurality of time points; and
means for utilizing the stored conversion data for each time point to transform the corresponding data point of the time series.

40. A method for facilitating a user accessing and manipulating time series comprising the steps of:
storing a plurality of blocks of time series in a first storing means, each of which blocks contains a number of time series;
cataloging said time series in hierarchical multilevel menu form by subject matter;
providing the user with a first subject matter menu in response to a user access request;
providing the user a successive level of subject matter menu in response to a user selection from the first and each successive subject matter menu;
providing the user with time series identifications for a block stored in the first storing means in response to a user selection from predetermined menu level;
transferring selected time series from the first storing means to a second storing means in response to the user selection from the time series identifications for a block, a predetermined area of said second storing means having capacity to store a number of time series being designated as a user area;
performing predetermined functions on one or more time series stored in said second storing means in response to user requests;
storing the results of each function performed in said user area;
cataloging time series stored in said user area; and
selectively transferring time series stored in said user area to said first storing means.

41. A method as claimed in claim 40 wherein up to a fixed number of time series are permitted in a block, and wherein the number of time series which said user area is adapted to store is said fixed number, whereby a user block may be stored in said user area.

42. A method as claimed in claim 41 wherein, during said selectively transferring step, a single time series may be transferred from said user area or the entire user block may be transferred.

43. A method as claimed in claim 42 including the step of storing in said user area selected time series originally transferred from said first storing means, whereby a particular user block may contain all time series needed by the user for a particular project.

44. A method as claimed in claim 40 including the step of providing the user at selected times with material not directly related to the time series being accessed or the manipulation thereof, which material is adapted to stimulate the user's creativity in the use of the system.

45. A method as claimed in claim 44 wherein the material provided to the user is in the form of literary snippets.

46. A method as claimed in claim 40 wherein the step of transferring time series from the first storing means to the second storing mean includes the step of transferring all of the time series for the block being provided in response to a user request.

47. A method as claimed in claim 40 wherein said function performing step includes the step of performing a moving transformation on said one or more time series.

48. A method as claimed in claim 47 wherein the step of performing a moving transformation includes the steps of identifying one or more time series on which the transformation is to be performed, said time series being formed of a plurality of data points, selecting a span number of periods (n), locating the span about a data point (x) of the time series, and for each data point (x) of the time series, starting with a selected data point, calculating the transformation of the time series for the data point x and the other (n−1) data points of the located span.

49. A method as claimed in claim 47 wherein the moving transformation performed is moving variance.

50. A method as claimed in claim 49 wherein the step of performing a moving transformation includes the steps of identifying one or more time series on which the transformation is to be performed, said time series being formed of a plurality of data points, selecting a span number of periods (n), and for each data point (x) of the time series, starting with a selected data point, locating the span about the data point (x) and calculating the transformation of the time series for the data point x and the other (n−1) data points of the located span.

51. A method as claimed in claim 47 wherein the moving transformation performed is moving standard deviation.

52. A method as claimed in claim 51 wherein the step of performing a moving transformation includes the steps of identifying one or more time series on which the transformation is to be performed, said time series being formed of a plurality of data points, selecting a span number of periods (n), locating the span about a data point (x) of the time series, and for each data point (x) of the time series, starting with a selected data point, calculating the transformation of the time series for the data point x and the other (n−1) data points of the located span.

53. A method as claimed in claim 47 wherein the moving transformation performed is moving correlation between at least two time series.

54. A method as claimed in claim 53 wherein the step of performing a moving transformation includes the steps of identifying at least two time series on which moving correlations is to be performed, said time series being formed of a plurality of data points, selecting a span number of periods (n), locating the span about a data point (x) of the time series, and for each data point (x) of the time series, starting with a selected data point, calculating the transformation of the time series for the data point x and the other (n−1) data points of the located span.

55. A method as claimed in claim 47 wherein the moving transformation performed is moving covariance between at least two time series.

56. A method as claimed in claim 55 wherein the step of performing a moving transformation includes the steps of identifying at least two time series on which moving covariance is to be performed, said time series being formed of a plurality of data points, selecting a span number of periods (n), locating the span about a data point (x) of the time series, and for each data point (x) of the time series, starting with a selected data point, calculating the covariance of the time series for the data point x and the other (n−1) data points of the located span.

57. A method as claimed in claim 40 wherein each of said time series is formed of a plurality of data points, each of said data points corresponding to a particular point in time; and wherein said function performing step includes the steps of storing as part of a shell operating system for a data processing means conversion data for a plurality of time points for at least a selected function, and utilizing the stored conversion data for each time point to transform the corresponding data points of a time series.

58. A method as claimed in claim 57 including the step of adding a transformation function to be performed by the system, said adding step including the step of adding corresponding conversion data to said shell for performing such function.

59. A method as claimed in claim 40 wherein said identifications provided for a block include a notes identification;

including the steps of storing notes with a block, said notes concerning at least the block and/or selected ones of the block time series; and providing the user with notes on the selected block or time series in response to the user selection of said notes identification and to a block or time series identification.

60. A method as claimed in claim 40 including the step of permitting the user, at at least a selected menu level, to back up to the previous menu level provided to him.

61. A method as claimed in claim 40 wherein said time series identification is a full title of the time series.

62. A method as claimed in claim 41 including the step of separately cataloging user blocks transferred to said first storing means.

63. A method as claimed in claim 42 including the step of separately cataloging time series from the user area which are transferred to said first storing means.

64. A method as claimed in claim 40 wherein the number of items in a menu and the number of time series in a block are limited so as to not overload the user in making a decision.

65. A method as claimed in claim 40 including the step of graphically displaying one or more time series stored in said second storing means, including time series stored in said user area, in response to user inputs.

66. A method as claimed in claim 65 wherein, during said graphically displaying step, two or more time series may be displayed on the same graph; and including the step of scaling at least one of the time series to facilitate the viewing of the two or more time series on the same graph.

67. A method as claimed in claim 66 wherein each time series contains a sequence of values for successive time points; and
wherein said scaling step includes the step of multiplying the values of the time series to be scaled by a factor equal to the average value of the time series not to be scaled divided by the average value of the time series to be scaled.

68. A method as claimed in claim 65 including the step of presenting a first portion of the graphic display of a time series with a given time interval between data points and presenting a second portion of the graphic display for the time series with a different time interval between data points.

69. A method for facilitating a user reconfiguring time series from a collection of time series stored in a collection storing means comprising the steps of:
providing a storing means having a user area for storing a plurality of time series;,
storing selected ones of said time series in said user area;
performing predetermined functions on one or more time series;
storing the results of functions performed in said user area;
indexing time series stored in said user area; and selectively transferring time series stored in the user area to the collections storing means.

70. A method as claimed in claim 69 wherein said collection storing means has an index for the collections of time series and a user time series storing area;
wherein time series transferred from the user area are transferred to said user time series storing area of the collection storing means; and
including the step of separately indexing time series stored in said user time series storing area.

71. A method as claimed in claim 70 wherein time series are stored ins aid collection storing means in blocks of related time series;
wherein said user area is adapted to store a block of time series wherein said transferring means may transfer either a selected one or more time series from said user area or the entire block in the user area; and
wherein said separately indexing step includes the step of separately indexing single series and entire blocks transferred to said user time series storing area.

72. A method for performing a moving transformation on one or more time series, each of which time series is formed of a plurality of data points, comprising the steps of:
identifying and storing the one or more time series on which the moving transformation is to be performed; selecting a span number of time periods (n); locating the span about a data point (x) of the time series; and for each data point (x) of the time series, starting with a selected data point, calculating the transformation of the time series for the data point (x) and the other (n−1) data points of the located span.

73. A method as claimed in claim 72 wherein the moving transformation performed is moving variance.

74. A method as claimed in claim 72 wherein the moving transformation performed is moving standard deviation.

75. A method as claimed in claim 72 wherein the moving transformation performed is moving correlation between at least two time series.

76. A method as claimed in claim 72 wherein the moving transformation performed is moving covariance between at least two time series.

* * * * *